US011810692B2

(12) United States Patent
Yamazaki et al.

(10) Patent No.: US 11,810,692 B2
(45) Date of Patent: Nov. 7, 2023

(54) COMPOSITE CABLE (71) Applicant: FURUKAWA ELECTRIC CO., LTD., Tokyo (JP)

(72) Inventors: Takanori Yamazaki, Tokyo (JP); Arifumi Matsumura, Tokyo (JP); Koichi Mizuno, Tokyo (JP); Masaki Nishiguchi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/483,955

(22) Filed: Sep. 24, 2021

(65) Prior Publication Data

US 2022/0013252 A1 Jan. 13, 2022

Related U.S. Application Data

(63) Continuation of application No. PCT/JP2020/011518, filed on Mar. 16, 2020.

(30) Foreign Application Priority Data

Mar. 27, 2019 (JP) .................................. 2019-061382

(51) Int. Cl.
*H01B 7/18* (2006.01)
*H01B 3/22* (2006.01)
(Continued)

(52) U.S. Cl.
CPC ................. *H01B 7/18* (2013.01); *H01B 3/22* (2013.01); *H01B 3/28* (2013.01); *B29C 48/154* (2019.02);
(Continued)

(58) Field of Classification Search
CPC . H01B 3/22; H01B 3/28; H01B 3/003; H01B 7/02; H01B 7/04; H01B 7/06;
(Continued)

(56) References Cited

U.S. PATENT DOCUMENTS

2010/0147549 A1* 6/2010 Shiina .................... H01B 7/295
174/120 SR
2013/0277087 A1* 10/2013 Hayakawa .......... B60R 16/0215
174/107
(Continued)

FOREIGN PATENT DOCUMENTS

JP 54-167385 U 11/1979
JP 3935320 B2 * 6/2007 ............... C08K 9/06
(Continued)

OTHER PUBLICATIONS

Japanese Notice of Reasons for Refusal for corresponding Japanese Application No. 2019-061382, dated May 10, 2022, with an English translation.

(Continued)

*Primary Examiner* — William H. Mayo, III
(74) *Attorney, Agent, or Firm* — Birch, Stewart, Kolasch & Birch, LLP (57) ABSTRACT

A composite cable includes a sheath surrounding an outer surface of a core at least including a plurality of thick electric wires each having a resin layer on an outer circumference of a conductor, and a plurality of thin electric wires each having a resin layer on an outer circumference of a
(Continued)

conductor, in which the sheath includes a resin composition including base resin containing at least one type of ethylene rubber and styrene elastomer at 10 to 50 mass %.

8 Claims, 1 Drawing Sheet

(51) Int. Cl.
| | |
|---|---|
| *H01B 3/28* | (2006.01) |
| *B29C 48/154* | (2019.01) |
| *B29K 19/00* | (2006.01) |
| *B29K 509/00* | (2006.01) |
| *B29L 31/34* | (2006.01) |
| *H01B 13/00* | (2006.01) |
| *H01B 3/24* | (2006.01) |

(52) U.S. Cl.
CPC ...... *B29K 2019/00* (2013.01); *B29K 2509/00* (2013.01); *B29L 2031/3462* (2013.01); *H01B 3/24* (2013.01); *H01B 13/003* (2013.01)

(58) Field of Classification Search
CPC ........ H01B 7/18; H01B 13/24; B29C 48/154; B29K 2019/00; B29K 2509/30
USPC ............................... 174/110 R–110 N, 113 R
See application file for complete search history.

(56) References Cited

U.S. PATENT DOCUMENTS

| | | | |
|---|---|---|---|
| 2015/0165987 A1* | 6/2015 | Hayakawa | H01B 7/0045 |
| | | | 174/72 A |
| 2016/0176369 A1* | 6/2016 | Ito | H01B 9/006 |
| | | | 174/72 A |

FOREIGN PATENT DOCUMENTS

| | | | | | |
|---|---|---|---|---|---|
| JP | 2013-237428 A | | 11/2013 | | |
| JP | 2014-9238 A | | 1/2014 | | |
| JP | 5541331 B2 | | 7/2014 | | |
| JP | 2017-145307 A | * | 8/2017 | ................ | C08J 3/22 |
| JP | 2017-145307 A | | 8/2017 | | |
| JP | 2017-145370 A | | 8/2017 | | |
| JP | 2017-147268 A | * | 8/2017 | ............... | H05K 9/00 |
| JP | 2016-110836 A | | 6/2018 | | |
| JP | 2018-178029 A | | 11/2018 | | |

OTHER PUBLICATIONS

International Search Report, issued in PCT/JP2020/011518, dated Jun. 9, 2020.
Japanese Notice of Reasons for Refusal, issued in Priority Application No. 2019-061382, dated Aug. 10, 2021.

* cited by examiner

Fig. 1

Fig. 2

COMPOSITE CABLE

CROSS-REFERENCE TO RELATED APPLICATIONS

This application is a Continuation of PCT International Application No. PCT/JP2020/011518 filed on Mar. 16, 2020, which claims priority under 35 U.S.C. § 119 (a) to Japanese Patent Application No. 2019-061382 filed in Japan on Mar. 27, 2019. Each of the above applications is hereby expressly incorporated by reference, in its entirely, into the present application.

TECHNICAL FIELD

The present invention relates to a composite cable.

BACKGROUND ART

In various products including industrial machines, industrial robots, vehicles (automobiles, electric trains, and the like), and the like, electronic control is employed as control of various operations and functions. For example, in automobiles, there is an antilock brake system (ABS) that controls running of an automobile by preventing lock of wheels in sudden braking or a brake operation on a low friction road, or the like. In addition, in recent years, an electronic parking brake (EPB) that electrically controls (maintains) a parked state in places of conventional hydraulic control or mechanical control has become common. These electronic controls normally include a control device, a sensor, and a cable electrically connecting these. The cable normally includes an electric wire serving as a core, and a sheath covering the electric wire.

In the above-described various products, electronic control tends to be in heavy usage, and an increasing number of cables are connected to the control device. In wiring a number of cables, by using a composite cable including several integrated cables (cable obtained by collectively covering cores including a plurality of electric wires included in cables, with a sheath), instead of separately wiring cables, space saving of cable wiring is achieved (Patent Literature 1).

CITATION LIST

Patent Literatures

Patent Literature 1: Japanese Patent No. 5541331

SUMMARY OF THE INVENTION

Technical Problem

Depending on the use application or the like, a composite cable is demanded to have various properties such as, for example, abrasion resistance, flexibility (bendability), heat resistance, a low-temperature property (property in which sheath is less susceptible to damage even under lower temperature of −40° C., for example), and furthermore, flex resistance (fracture prevention property of a conductor for bending, will also be referred to as bending resistance). For example, the above-described ABS and EPB has a configuration in which a control device mounted on a vehicle body, and a sensor provided on a tire (suspension) side are connected via a cable. Because cables used in these brake control devices are exposed to vibration caused by running, a position variation of a tire or the like with respect to a vehicle body, and the like, excellent flexibility and flex resistance are demanded among the above-described properties.

As material forming a sheath of such a composite cable, polyurethane excellent in abrasion resistance or a low-temperature property has been used (refer to Patent Literature 1). Nevertheless, because the composite cable becomes thick by incorporating two sets of electric wires or more, flexibility and flex resistance of the composite cable itself decline, and if a larger number of electric wires are incorporated into a sheath, the decline becomes prominent. Moreover, if the sheath is formed of polyurethane, a decline in flexibility and flex resistance is inevitable.

The present invention provides a composite cable excellent in flexibility and flex resistance while maintaining abrasion resistance and a low-temperature property.

Solution to Problem

The present inventors et al. found that a composite cable having high level of abrasion resistance, a low-temperature property, flexibility, and flex resistance can be generated by forming a sheath of a composite cable using a resin composition including base resin containing at least one type of ethylene rubber and styrene elastomer among various types of rubber, at 10 to 50 mass %. The present inventors et al. have further conducted researches based on these findings, and have completed the present invention.

That is, the above-described problems of the present invention can be solved by the following means.

<1> A composite cable includes a sheath surrounding an outer surface of a core at least including a plurality of thick electric wires each having a resin layer on an outer circumference of a conductor, and a plurality of thin electric wires each having a resin layer on an outer circumference of a conductor, in which the sheath includes a resin composition including base resin containing at least one type of ethylene rubber and styrene elastomer at 10 to 50 mass %.

<2> The composite cable described in <1>, in which the sheath includes cross-linked material of the resin composition.

<3> The composite cable described in <1> or <2>, in which the base resin contains organic mineral oil.

<4> The composite cable described in <3>, in which a ratio ($C_E$:$C_O$) between a content percentage ($C_E$) of the ethylene rubber and the styrene elastomer, and a content percentage ($C_O$) of the organic mineral oil is 50:50 to 75:25.

<5> The composite cable described in any one of <1> to <4>, in which the resin composition contains an inorganic filler with a 10 to 150 mass part with respect to a base resin 100 mass part.

<6> The composite cable described in <5>, in which the inorganic filler is at least one type selected from the group consisting of silica, aluminum hydroxide, magnesium hydroxide, calcium carbonate, and antimonous oxide.

<7> The composite cable described in any one of <1> to <6>, in which the composite cable is for brake control of a vehicle.

<8> The composite cable described in <7>, in which two of the plurality of thick electric wires are used as a pair of power wires that supply power from a control device of an electronic parking brake to an actuator, and two of the plurality of thin electric wires are used as a pair of signal wires that transmit a signal from an antilock brake system sensor to an antilock brake system control device.

In the present invention, the numerical range expressed by using the expression "to" means a range including numerical values before and after the expression "to" as the lower limit and the upper limit.

In addition, "at least including XXX" or "including at least XXX" each encompasses an embodiment formed by XXX and materials and components other than this, and the like, in addition to an embodiment formed by XXX.

Effects of Invention

A composite cable of the present invention maintains excellent abrasion resistance and low-temperature property, and is also excellent at flexibility and flex resistance.

Other and further features and advantages of the present invention will appear more fully from the following description, appropriately referring to the accompanying drawings.

DESCRIPTION OF EMBODIMENTS

[Composite Cable]

A composite cable of the present invention includes a sheath surrounding an outer surface of a core at least including a plurality of thick electric wires each having a resin layer on an outer circumference of a conductor, and a plurality of thin electric wires each having a resin layer on an outer circumference of a conductor. Then, the sheath is formed by a resin composition including base resin containing at least one type of ethylene rubber and styrene elastomer at 10 to 50 mass %.

By forming the sheath of the composite cable using the above-described resin composition, a composite cable having a high level of abrasion resistance, low-temperature property, flexibility, and flex resistance can be obtained. The detailed reason thereof has not been identified yet, but the following consideration can be given.

By combining the core including the plurality of thick electric wires and the plurality of thin electric wires, and the above-described resin composition as material forming the sheath, the core and the sheath become balanced, and abrasion resistance is considered to be improved without impairing flexibility and flex resistance obtained when the composite cable is formed. In addition, because the sheath having the above-described resin composition can maintain excellent flexibility up to a low-temperature region, the sheath is considered to exhibit an excellent low-temperature property.

In the present invention, the sheath surrounding the outer surface of the core means that the sheath is arranged on (covering) the outer surface of the core. That is, this means the sheath collectively incorporating the core. In the present invention, the sheath may collectively cover (incorporate) the core while interposing a separator (paper, cloth, layer formed by resin such as polyethylene terephthalate), or may directly cover the core collectively.

The composite cable of the present invention is not specifically limited except for material forming the sheath, and the same configuration as a known composite cable in which two sets of electric wires or more are integrated can be applied.

Figure 1:
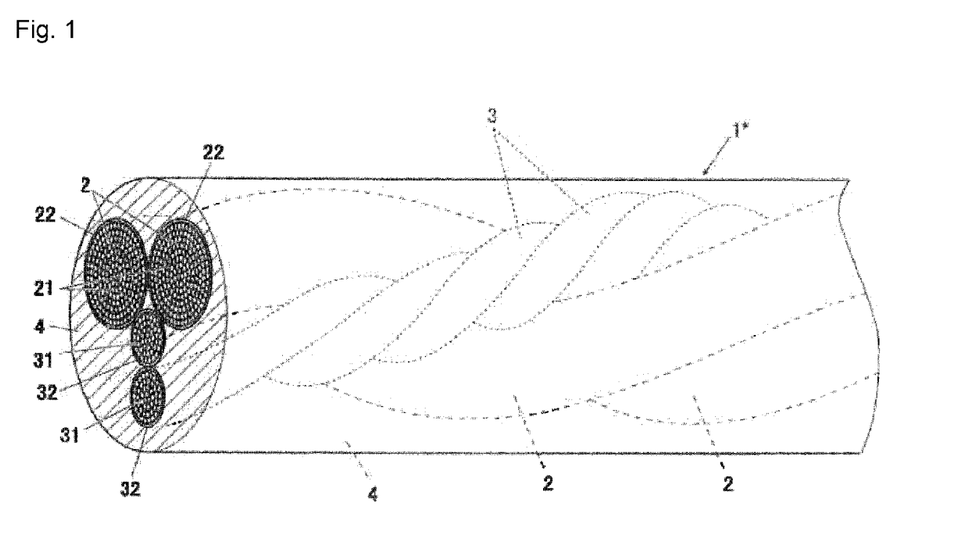
FIG. 1 is an end portion oblique perspective view schematically illustrating a preferred embodiment of a composite cable of the present invention.

Like a composite cable 1 illustrated in FIG. 1, an preferred embodiment of the composite cable of the present invention includes a core at least including one set of two (pair of) thick electric wires 2 each having a resin layer 22 on an outer circumference of a conductor 21, and one set of two (pair of) thin electric wires 3 each having a resin layer 32 on an outer circumference of a conductor 31, and a sheath 4 surrounding an outer surface of the core. The core (will also be referred to as a conductor core.) at least including the two thick electric wires 2 and the two thin electric wires 3 is formed as a twisted wire obtained by twisting together three wires corresponding to a twisted wire of the thin electric wires 3 and the two thick electric wires 2.

Hereinafter, the composite cable of the present invention and an embodiment thereof will be described.

<Core>

The composite cable of the present invention at least includes, as a core, two types of electric wires with different diameters. Specifically, the composite cable includes a plurality of thick electric wires and a plurality of thin electric wires. The thick electric wires are electric wires having the thickest diameter among electric wires included in the conductor core, and the thin electric wires are electric wires having the thinnest diameter among electric wires included in the conductor core.

The thick electric wires and the thin electric wires are used for use applications different from each other. Normally, a pair of thick electric wires and a pair of thin electric wires are each used as one set, but three or more electric wires may be used as one set. In a case where a plurality of sets of thick electric wires and a plurality of sets of thin electric wires are included, the sets of electric wires may be used for the same use application or may be used for different use applications.

An arrangement state of thick electric wires and thin electric wires in the conductor core is not specifically limited, and an arrangement state applied to a normal core can be appropriately employed. For example, electric wires may be arranged (apposed) in parallel independently of each other, or may be arranged with being twisted together (twisted wire). From the viewpoint of flexibility and flex resistance as a composite cable, it is preferable to arrange electric wires while twisting the electric wires together. Thick electric wires and thin electric wires may independently form twisted wires, but it is preferable that one twisted wire is formed as a whole. In this case, thick electric wires and thin electric wires may independently form twisted wires, but as illustrated in FIG. 1, it is preferable to form a twisted wire with a uniform twisting rate by twisting together a pair of thin electric wires formed as a twist pair wire, and thick electric wires. The number of electric wires, the arrangement of electric wires, a twisting direction, a twist pitch, and the like that are to be set when electric wires are twisted together are not specifically limited, are appropriately set in accordance with a use application or the like. When electric wires are twisted together, electric wires can also be twisted while interposing resin such as polyethylene terephthalate (PET) or polypropylene (PP). Thus, the shape of the conductor core can be freely controlled.

(Thick Electric Wire)

The thick electric wire is only required to have a resin layer on an outer circumference of the conductor, and a normal (insulated) electric wire can be used without specific limitation.

The composite cable of the present invention is only required to include at least two thick electric wires. Preferably, the composite cable includes two to six thick electric wires, and more preferably includes two to four thick electric wires. In addition, a plurality of thick electric wires may be incorporated as one set, or may be incorporated as a plurality of sets.

An outer diameter of the thick electric wire is not specifically limited as long as the thick electric wire is thicker than the thin electric wire to be described later, and can be appropriately determined in accordance with a use application or the like. For example, from the viewpoint of strength and flexibility, the outer diameter is preferably 1.0 to 5.0 mm, and more preferably, 2.0 to 4.0 mm. A conductor cross-sectional area of the thick electric wire is appropriately determined in accordance with a use application or the like, but is preferably 0.3 to 8.0 SQ, and more preferably, 0.5 to 3.0 SQ.

The thick electric wire is used for use application in which larger current flows than the thin electric wire to be described later.

—Conductor—

A conductor is not specifically limited, and can be a wire or a twisted wire obtained by twisting a plurality of wires together, but a twisted wire is preferable. A cross-sectional shape of the conductor (wire) is not specifically limited, and may be a circular cross section (round wire) or a rectangular cross section (rectangular wire). The material forming the conductor (wire) is not specifically limited, and can be copper, aluminum, or an alloy of these, or the like.

The number of wires forming a twisted wire is not specifically limited as long as the number is plural (two or more). The arrangement of wires, a twisting direction, a twist pitch, and the like that are to be set when wires are twisted together are appropriately set in accordance with a use application or the like.

An outer diameter of the conductor is not specifically limited, but is preferably a diameter thicker than the conductor of the thin electric wire to be described later, and can be appropriately determined in accordance with a use application or the like. For example, from the viewpoint of strength and flexibility, the outer diameter is preferably 0.5 to 4.0 mm, and more preferably, 1.0 to 3.5 mm. The outer diameter of wires included in a twisted wire is not specifically limited as long as the diameter of the above-described outer conductor is satisfied. For example, the outer diameter is preferably 0.05 to 0.5 mm, and more preferably 0.05 to 0.3 mm.

—Resin Layer—

The resin layer may be a single layer or a multiple layer as long as the resin layer surrounds an outer circumferential surface of the conductor (covers the conductor). Normally, the resin layer is formed by heat resistant resin. The heat resistant resin is not specifically limited, and resin forming a normal (insulated) electric wire can be used without specific limitation. For example, thermoplastic resin and thermoset resin are included. More specifically, (cross-linked) polyethylene, polyamide, polyamide-imide (PAI), polyimide (PI), polyurethane, chloroprene rubber, rubber containing ethylene-vinyl acetate copolymer (EVA rubber), and the like are included. The resin layer may contain normally-used various additive agents.

The (total) layer thickness of the resin layer is not specifically limited, and can be appropriately determined in accordance with a use application or the like. For example, from the viewpoint of heat resistance, flexibility, and abrasion resistance, the layer thickness is preferably 0.2 to 1.5 mm, and more preferably 0.2 to 1.0 mm.

In the present invention, in a case where the conductor is a twisted wire, the layer thickness of the resin layer means a shortest distance between a virtual circumcircle of all wires included in the conductor, and an external profile line of the resin layer in a cross section vertical to an axial line of an electric wire.

(Thin Electric Wire)

The thin electric wire is only required to have a resin layer on an outer circumference of the conductor, and a normal (insulated) electric wire can be used without specific limitation.

The composite cable of the present invention is only required to include at least two thin electric wires. Preferably, the composite cable includes two to twelve thin electric wires, and more preferably includes two to six thin electric wires. In addition, a plurality of thin electric wires may be incorporated as one set, or may be incorporated as a plurality of sets.

The thin electric wire is an electric wire having an outer diameter thinner than that of the above-described thick electric wire, and the configuration, material, and the like are the same as those of the above-described thick electric wire.

The outer diameter of the thin electric wire can be appropriately determined in accordance with a use application or the like. For example, from the viewpoint of strength and flexibility, the outer diameter is preferably 0.5 to 2.5 mm, and more preferably, 1.0 to 2.0 mm. An outer diameter difference from the thick electric wire is not specifically limited, but is preferably 0.5 to 2.0 mm, for example. A conductor cross-sectional area of the thin electric wire is appropriately determined in accordance with a use application or the like, but is preferably 0.05 to 2.0 SQ, and more preferably, 0.05 to 1.25 SQ, for example. An outer diameter of the conductor in the thin electric wire is appropriately determined in accordance with a use application or the like, and is preferably 0.3 to 2.0 mm, and more preferably, 0.3 to 1.5 mm, for example. In a case where the conductor is a twisted wire, the outer diameter of wires included in a twisted wire is not specifically limited as long as the diameter of the above-described outer conductor is satisfied. For example, the outer diameter is preferably 0.05 to 0.4 mm, and more preferably 0.05 to 0.3 mm. The (total) layer thickness of the resin layer is not specifically limited, and can be appropriately determined in accordance with a use application or the like. For example, from the viewpoint of heat resistance, flexibility, and abrasion resistance, the layer thickness is preferably 0.2 to 1.0 mm, and more preferably 0.2 to 0.5 mm.

It is preferable to use cross-linked polyethylene electric wires as a thick electric wire and a thin electric wire. As such electric wires, for example, an electric wire including, as base resin, cross-linked polyethylene having a heatproof temperature equivalent to 120° C., such as cross-linked polyethylene insulated heat-resistant low-voltage wires for automobiles (AEX) and very thin cross-linked polyethylene insulated heat-resistant low-voltage wires for automobiles (AESSX) as defined in Japanese Automotive Standards Organization (JASO) D 611 is included. The cross-linked polyethylene electric wire may be appropriately manufactured, or a marketed electric wire may be used.

(Other Electric Wires)

The conductor core may include an (insulated) electric wire aside from the above-described thick electric wire and thin electric wire. The electric wire is only required to be an electric wire having an outer diameter thinner than that of the thick electric wire, and thicker than that of the thin electric wire, and the configuration and material are the same as those of the thick electric wire and the thin electric wire.

<Sheath>

The composite cable of the present invention includes a sheath covering an outer surface of the above-described conductor core. As the sheath, a sheath in a normal composite cable can be applied except that the sheath is formed by a resin composition to be described later.

The sheath may be a single layer or a multilayer, and the layer thickness thereof can be appropriately determined in accordance with a use application or the like. From the viewpoint of flexibility, flex resistance, and abrasion resistance, the layer thickness of the sheath is preferably 0.5 to 3.0 mm, and more preferably 0.8 to 2.0 mm, for example. In the present invention, the layer thickness of the sheath means a shortest distance between a virtual circumcircle of all conductors included in the conductor core, and an external profile line of the sheath in a cross section vertical to an axial line of the composite cable.

A cross-sectional shape (external profile line) of the composite cable is not specifically limited, but normally, is a circular shape.

The outer diameter of the sheath (synonymous with diameter of composite cable, and corresponds to diameter of external profile line) can be appropriately determined in accordance with a use application or the like, and is not specifically limited. For example, from the viewpoint of flexibility, flex resistance, and abrasion resistance, the outer diameter is preferably 5.0 to 30.0 mm, and more preferably, 5.0 to 15.0 mm.

The sheath includes a resin composition including base resin containing at least one type of ethylene rubber and styrene elastomer at 10 to 50 mass %. Thus, as described above, high level of abrasion resistance, a low-temperature property, flexibility, and flex resistance can be given to the composite cable.

In the present invention, the sheath (resin layer) including a resin composition means that the sheath (resin layer) is formed by a resin composition, and encompasses both embodiments of an embodiment of being formed by non-cross-linked material of the resin composition, and an embodiment of being formed by cross-linked material of the resin composition. From the viewpoint of abrasion resistance, and furthermore, the viewpoint of heat resistance, the embodiment of being formed by cross-linked material of the resin composition is preferable.

From the viewpoint of abrasion resistance and heat resistance, and furthermore, viewpoint of assembly workability, cross-linked material of the resin composition forming the sheath is preferably electron beam cross-linked material of a (cross-linked) resin composition, or silane cross-linked material (silanol condensation hardened compound of silane cross-linked resin composition to be described later), and more preferably, silane cross-linked material.

The details of the resin composition and hardened material thereof will be described in a manufacturing method of the composite cable to be described later.

[Use Application of Composite Cable]

The composite cable of the present invention is preferably used as an electronic control cable of various products such as, for example, industrial machines, industrial robots, and vehicles. Among these products, the composite cable is more preferably used as an electronic control cable of a product including two or more relatively movable members, because the composite cable is excellent at flexibility and flex resistance. In particular, the composite cable is preferably used for brake control (ABS and EPB) of an automobile, in a movable part of an industrial robot, and the like.

In a case where the composite cable is used in a brake system of an automobile, it is preferable that a pair of two thick electric wires of the composite cable are used as power wires for EPB, and a pair of two thin electric wires are used as signal wires for ABS. The thick electric wire (power wire) is electrically connected to a control device of an electronic parking brake mounted on a vehicle body, and an actuator provided on a tire side, and supplies power to the actuator from the control device. On the other hand, the thin electric wire (signal wire) is electrically connected to an ABS control device mounted on the vehicle body, and an ABS sensor provided on the tire side, and transmits a signal (a signal of a lock state of a tire) from the ABS sensor to the ABS control device. Furthermore, a cable for transmitting a signal for controlling a brake caliper based on this signal may be the same as the thin electric wire (signal wire) or may be different from the thin electric wire (signal wire), and is appropriately determined.

The composite cable is normally connected to a predetermined control device and a sensor after processing end portions (terminals) of thin electric wires and thick electric wires. At this time, because the composite cable of the present invention is excellent not only at flex resistance but also at flexibility, a wiring work (assembly work) can be performed by easily (with weak force) bending the composite cable of which terminals are processed.

[Manufacturing Method of Composite Cable]

Materials or components to be used in manufacturing of the composite cable of the present invention will be described.

<Electric Wire>

For manufacturing the composite cable of the present invention, the above-described cross-linked polyethylene electric wires are prepared as two types or more of electric wires having different diameters such as, for example, the above-described thick electric wire and thin electric wire. The electric wires may be appropriately manufactured in compliance with a normal method, or marketed wires may be used.

<Resin Composition for Sheath Formation>

A resin composition used for forming a sheath includes base resin containing at least one type of ethylene rubber and styrene elastomer at 10 to 50 mass %. The resin composition may be non-cross-linked in the formation of the sheath, but it is preferable that the resin composition is cross-linked (electron beam cross-linked) by the emission of electron beams, or is cross-linked (silane cross-linked) by a silane cross-linking method to be described later.

(Base Resin)

Ethylene rubber and styrene elastomer each include a cross-linkable region in electron beam cross-linking, or a grafting reactive region with a grafting reaction region of silane coupling agent in silane cross-linking (in the presence of radical generated from an organic peroxide to be described later), in a main chain or at a tail end thereof. Examples of the cross-linkable region or the grafting reactive region include an unsaturated bond region of a carbon chain, a carbon atom including a hydrogen atom, and the like.

The base resin may contain another resin, and may further contain organic mineral oil and the like.

—Ethylene Rubber—

Ethylene rubber is not specifically limited as long as the ethylene rubber is rubber (including elastomer) including a copolymer obtained by copolymerizing a compound having ethylene unsaturated bond, and known ethylene rubber can be used. Preferably, the ethylene rubber includes binary copolymer rubber of ethylene and α-olefin, a ternary copolymer rubber of ethylene, α-olefin, and diene, and the like. A diene constituent of the ternary copolymer may be a conjugated diene constituent or an unconjugated diene constituent, but an unconjugated diene constituent is preferable.

As an α-olefin constituent, α-olefin constituents with carbon numbers 3 to 12 are preferable. Examples of conjugated diene constituents include constituents such as butadiene, isoprene, and 1,3-pentadiene, 2,3-dimethyl-1,3-butadiene, and the like, and a butadiene constituent or the like is preferable. Specific examples of unconjugated diene constituents include constituents such as dicyclopentadiene (DCPD), ethylidene norbornene (ENB), and 1,4-hexadiene.

As binary copolymer rubber, ethylene-propylene rubber (EPM) is preferable, and as ternary copolymer, ethylene-propylene-diene rubber (EPDM) is preferable.

One type of ethylene rubber may be singularly used, or two types of more of ethylene rubber may be used.

—Styrene Elastomer—

The styrene elastomer refers to styrene elastomer including a polymer including an aromatic vinyl compound as a constituent, in a molecule. As such a styrene elastomer, a block copolymer and a random copolymer of a conjugated diene compound and an aromatic vinyl compound, or hydrogenated substance of these, and the like are included. As such a styrene elastomer, for example, styrene-ethylene-butylene-styrene block copolymer (SEBS), styrene-isoprene-styrene block copolymer (SIS), hydrogenated SIS, styrene-butadiene-styrene block copolymer (SBS), hydrogenated SBS, styrene-ethylene-ethylene-propylene-styrene block copolymer (SEEPS), styrene-ethylene-propylene-styrene block copolymer (SEPS), styrene-butadiene rubber (SBR), hydrogenated styrene-butadiene rubber (HSBR), and the like are included.

One type of styrene elastomer may be singularly used, or two types of more of styrene elastomer may be used.

—Other Resin—

Other resins that may be included in base resin are not specifically limited, but polyolefin series resin is preferable in that the polyolefin series resin is electron beam cross-linkable, or grafting reactive with silane coupling agent to be described later.

Polyolefin series resin is not specifically limited as long as the polyolefin series resin is resin including homopolymer or copolymer of compound having ethylene unsaturated bond, and polyolefin resin used in a normal electric wire or cable can be used. For example, resin such as polyethylene, polypropylene, ethylene-α-olefin copolymer, and polyolefin copolymer including acid copolymerized component or acid ester copolymerized component, and rubber or elastomer of these polymers, and the like are included. Rubber or elastomer is only required to be rubber or elastomer other than ethylene rubber and styrene elastomer. For example, copolymerized rubber (ethylene-acrylic rubber) of alkyl acrylate and ethylene, and the like are included. Among these, resin such as polyethylene, polypropylene, ethylene-α-olefin copolymer, or polyolefin copolymer including acid copolymerized component is preferable. Polyethylene resin is more preferable in that an improvement effect of abrasion resistance is large by being used together with ethylene rubber or styrene elastomer.

The polyethylene resin is only required to be resin of polymer including an ethylene constituent. For example, high-density polyethylene (HDPE), low-density polyethylene (LDPE), ultrahigh molecular weight polyethylene (UHMW-PE), linear low-density polyethylene (LLDPE), and very low density polyethylene (VLDPE) are included. Among these, linear low-density polyethylene and low-density polyethylene are preferable.

As resin of polyolefin copolymer including acid copolymerized component or acid ester copolymerized component, for example, resins including ethylene-vinyl acetate copolymer, ethylene-(meta) acrylic acid copolymer, ethylene-(meta) alkyl acrylate copolymer (preferably, carbon numbers 1 to 12) copolymer, and the like are included.

One type of polyolefin series resin may be used singly, or two or more types thereof may be used in combination.

—Organic Mineral Oil—

As organic mineral oil, oil normally used in a resin composition can be used without specific limitation, and includes paraffinic oil and naphthenic oil, and paraffinic oil is preferable. One type of organic mineral oil may be used singly, or two or more types thereof may be used in combination.

—Content Percentage of Each Component in Base Resin—

A total content percentage of ethylene rubber and styrene elastomer in base resin is 10 to 50 mass %, and preferably 20 mass % or more, and more preferably, 30 mass % or more. An upper limit value of the total content percentage is preferably 45 mass % or less.

A content percentage of ethylene rubber or styrene elastomer in base resin is appropriately set within the range satisfying the above-described total content percentage. For example, a content percentage of ethylene rubber or styrene elastomer is preferably 10 to 40 mass %, and more preferably, 20 to 40 mass %.

A total content percentage of polyolefin series resin in base resin is not specifically limited, but preferably 0 to 50 mass %, and more preferably, 10 to 40 mass %.

In the present invention, a content percentage in base resin of each of the above-described resins contained in polyolefin series resin is appropriately set within the range in which the above-described content percentage of polyolefin series resin is satisfied. For example, a content percentage of polyethylene resin is preferably 0 to 40 mass %, and more preferably, 20 to 30 mass %.

A content percentage of organic mineral oil in base resin is not specifically limited, but preferably, 0 to 40 mass %, and more preferably, 10 to 35 mass %.

In base resin, a ratio ($C_E:C_O$) between a (total) content percentage ($C_E$) of ethylene rubber and styrene elastomer, and a content percentage ($C_O$) of organic mineral oil is preferably 50:50 to 75:25, and more preferably, 55:45 to 65:35.

Aside from the above-described base resin, the resin composition preferably contains the following inorganic filler, and may contain various additive agents such as antioxidant. A contained amount of the inorganic filler with respect to base resin is as described later.

In a case where the resin composition is silane cross-linkable, in addition to base resin, the resin composition preferably contains silane coupling agent grafted to base resin, and silanol condensation catalyst, and preferably further contains an inorganic filler. Thus, heat resistance, and furthermore, abrasion resistance can be improved to higher levels. As each of these components, one type may be used or two or more types may be used.

(Silane Coupling Agent Grafted to Base Resin)

In the resin composition, the silane coupling agent is grafting reacted to base resin.

Such silane coupling agent is preferably obtained by allowing a grafting reaction to base resin in the presence of organic peroxide.

—Silane Coupling Agent—

Silane coupling agent to be used for grafting reaction is not specifically limited as long as the silane coupling agent includes a grafting reaction region (group or atom) that can grafting react to a grafting reactive region of base resin, in the presence of radical generated by decomposition of organic peroxide to be described later, and a hydrolyzable silyl group that is silanol condensable. As such silane coupling agent, silane coupling agent used in a normal silane cross-linking method is included. As such silane coupling agent, silane coupling agent including a vinyl group or a (meta) acryloyl group as a grafting reaction region is included. Specifically, vinylsilane such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and (metha) acryloxysilane such as methacryloxypropyltrimethoxysilane, methacryloxypropyltriethoxysilane, and methacryloxypropylmethyldimethoxysilane are included. Among these, vinyltrimethoxysilane or vinyltriethoxysilane is particularly preferable.

—Organic Peroxide—

The organic peroxide used for grafting reaction at least has a function of generating radical by thermal decomposition, and causing, as catalyst, grafting reaction caused by radical reaction of silane coupling agent to base resin (covalent bonding formation reaction of grafting reaction region of silane coupling agent and grafting reactive region of base resin, will also be referred to as (radical) additional reaction). As such an organic peroxide, organic peroxide having the above-described function and used in radical polymerization or a normal silane cross-linking method can be used without specific limitation. For example, benzoyl peroxide, dicumyl peroxide (DCP), 2,5-dimethyl-2,5-di (tert-butylperoxy)hexane, or 2,5-dimethyl-2,5-di-(tert-butylperoxy)hexane-3 is preferable.

A decomposition temperature of organic peroxide is preferably 80 to 195° C., and particularly preferable, 125 to 180° C. The decomposition temperature refers to a temperature at which endotherm or exotherm starts when heating is performed from room temperature at a rate of temperature increase of 5° C./minute under nitrogen gas atmosphere using heat analysis such as a DSC method.

—Base Resin to which Silane Coupling Agent is Grafted—

In a silane cross-linkable resin composition, as the above-described base resin and silane coupling agent grafted to base resin, base resin, and base resin to which silane coupling agent is grafted (silane graft resin) that are appropriately synthesized or marketed can be used.

(Silanol Condensation Catalyst)

Silanol condensation catalyst causes (promotes) silanol condensation reaction of silane coupling agent grafted to base resin, in the presence of water.

Such a silanol condensation catalyst is not specifically limited, and for example, organotin compound, metal soap, platinum compound, and the like are included. As organotin compound, for example, organotin compound such as dibutyltin dilaurate, dioctyltin dilaurate, dibutyltin dioctiate, and dibutyltin diacetate is included.

—Carrier Resin—

Silanol condensation catalyst is preferably used as a mixture (catalyst master batch) with resin (carrier resin). Resin is not specifically limited, and each resin described in the above-described base resin can be used.

(Inorganic Filler)

An inorganic filler is preferably an inorganic filler having, on its surface, a region that can form hydrogen bonding or the like with a hydrolyzable silyl group of silane coupling agent, or a region that can perform chemical bonding caused by covalent bonding. As the region that can perform chemical bonding with the hydrolyzable silyl group of silane coupling agent, OH group (OH group such as hydroxyl group, hydrous or crystalline water molecule, and carboxy group), amino group, SH group, and the like are included.

As an inorganic filler, for example, metal hydrate such as compound including a hydroxyl group or crystalline water, which includes aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, and hydrotalcite, and furthermore, boron nitride, silica (crystalline silica, amorphous silica, and the like), carbon, clay, zinc oxide, tin oxide, titanium oxide, molybdenum oxide, antimonous oxide, silicone compound, quartz, talc, zinc borate, white carbon, zinc borate, zinc hydroxystannate, zinc stannate, zinc stannate are included. Among these, at least one type selected from the group consisting of silica, aluminum hydroxide, magnesium hydroxide, calcium carbonate, and antimonous oxide is preferable.

The inorganic filler preferably corresponds to particles, and an average particle diameter is appropriately set.

As the inorganic filler, an inorganic filler surface-engineered using normal surface preparation agent can also be used.

—Contained Amount of Each Component in Resin Composition—

A content percentage of base resin in a resin composition is not specifically limited. For example, the content percentage is preferably 30 to 80 mass %, and more preferably, 40 to 70 mass %.

In a case where a resin composition is a silane cross-linkable resin composition (silane cross-linkable resin composition), a contained amount of each component is set with respect to a base resin 100 mass part. The base resin 100 mass part means a total contained amount of components included in base resin, and normally means a total amount of resin components including ethylene rubber, styrene elastomer and polyolefin series resin, and organic mineral oil.

In the silane cross-linkable resin composition, a content percentage in base resin of each component included in base resin is as described above.

A contained amount of silane coupling agent in silane cross-linkable resin composition is preferably 1 to 15 mass part, more preferably, 3 to 12 mass part, and further preferably, 4 to 12 mass part, with respect to a base resin 100 mass part. In a case where silane coupling agent is grafted to polyolefin series resin, a contained amount of silane coupling agent is a contained amount converted into a contained amount of silane coupling agent before grafting reaction.

A contained amount of silanol condensation catalyst in a silane cross-linkable resin composition is not specifically limited, but preferably, the contained amount is 0.001 to 0.6 mass part, and more preferably, 0.01 to 0.4 mass part, with respect to a base resin 100 mass part. If the composition amount of silanol condensation catalyst falls within the above-described range, cross-linking reaction of silane coupling agent caused by silanol condensation reaction easily progresses uniformly, and heat resistance of silane cross-linked material can be enhanced. Furthermore, external appearance deterioration and a decline in physicality can be prevented, and productivity is enhanced.

In a case where the silane cross-linkable resin composition contains an inorganic filler, a contained amount of the inorganic filler is preferably 10 to 150 mass part, more preferably, 30 to 120 mass part, and further preferably, 50 to 100 mass part, with respect to a base resin 100 mass part.

A composition amount of another resin or the above-described additive that can be used aside from the above-described components is appropriately set without impairing the purpose of the present invention.

A manufacturing method of the composite cable of the present invention will be described.

<Manufacturing of Conductor Core>

In a case where a conductor core has a twisted wire structure, a twisted wire is formed by twisting prepared electric wires together using a normal method.

For example, a manufacturing method in Examples are included.

<Formation of Sheath>

A sheath can be formed by arranging a resin composition on the outer surface of the conductor core, and performing cross-linking if required.

The formation method of the sheath varies depending on the presence or absence of cross-linking and a cross-linking method.

—Method of Forming Sheath Using Non-Cross-Linked Material of Resin Composition—

First of all, a resin composition is prepared by mixing components. A mixing method is not specifically limited as long as the method is a method normally used for preparation of a composition, and various mixing devices can be used. A mixing condition is not specifically limited, and is appropriately set. Normally, mixing is performed by melting base resin.

Subsequently, the obtained resin composition is arranged (molded) on the outer surface of the conductor core. An arrangement method is not specifically limited, and an extrusion molding method, an injection molding method, and other molding methods that use molding machines are included. A method of performing extrusion molding simultaneously with the conductor core is preferable. A molding temperature is set to a temperature at which base resin melts, in accordance with the type of base resin and various conditions of extrusion speed (drawing speed). For example, the molding temperature can be set to 80 to 250° C.

The preparation and molding of the resin composition can be performed simultaneously or consecutively.

By arranging a layer of resin composition on the outer surface of the conductor core in this manner, the composite cable of the present invention including the sheath including non-cross-linked material of the resin composition can be manufactured.

—Method of Forming Sheath Using Electron Beam Cross-Linked Material of Resin Composition—

In the case of forming a sheath using electron beam cross-linked material of a resin composition, cross-linking is performed by emitting electron beams to the layer of the resin composition arranged on the outer surface of the conductor core similarly to the above-described method of forming a sheath using non-cross-linked material of a resin composition.

In the electron beam cross-linked resin composition, by appropriately adding methacrylate series cross-linking auxiliary agent as cross-linking auxiliary agent, a degree of cross-linking can be enhanced.

As cross-linking auxiliary agent, a polyfunctional compound normally used in cross-linking of resin can be used. For example, a polyfunctional vinyl compound such as divinylbenzenen and triallyl cyanurate, and a polyfunctional (metha) acrylate compound such as ethylene glycol dimethacrylate, diethylene glycol dimethacrylate, triethylene glycol dimethacrylate, polyethylene glycol dimethacrylate, trimethylolpropane trimethacrylate, and allyl methacrylate are included. More specifically, cross-linking auxiliary agent used in Examples is included.

A contained amount of cross-linking agent is preferably 1 to 5 mass part with respect to a base resin 100 mass part.

An emission condition of electron beams is appropriately set in accordance with the type of base resin, a degree of cross-linking, and the like.

In this manner, the composite cable of the present invention including a sheath including electron beam cross-linked material of a resin composition can be manufactured.

—Method of Forming Sheath Using Silane Cross-Linked Material of Resin Composition—

In the method of forming a sheath using silane cross-linked material (cable manufacturing method using silane cross-linking method), first of all, the following silane cross-linkable resin composition is prepared.

A contained amount (composition amount) of each component in the following silane cross-linkable resin composition is as described above.

Silane Cross-Linkable Resin Composition:

Silane cross-linkable resin composition containing base resin containing at least one of ethylene rubber and styrene elastomer at 10 to 50 mass %, silane coupling agent grafted to the base resin, and silanol condensation catalyst, and preferably containing an inorganic filler The silane cross-linkable resin composition can be prepared using marketed silane graft resin similarly to the above-described non-cross-linkable resin composition. Preferably, the silane cross-linkable resin composition is prepared by the following process (1).

As the cable manufacturing method using the silane cross-linking method, a method including the following processes (1) to (3) is preferable.

Process (1): process of melt mixing the above-described base resin, the above-described silane coupling agent, silanol condensation catalyst, and preferably an inorganic filler at a temperature equal to or larger than a decomposition temperature of an organic peroxide in the presence of the organic peroxide Process (2): process of arranging the silane cross-linkable resin composition on the outer circumferential surface of the conductor core Process (3): process of cross-linking the silane cross-linkable resin composition in contact with water In the process (1), a mixing order of each component is not specifically limited, and the components may be mixed in any order. A condition in a process (1-1b) to be described later can be applied to a melt mixing condition.

By the process, base resin and silane coupling agent are grafted by radical generated from the organic peroxide. In this manner, silane graft resin is synthesized, and a silane cross-linkable resin composition including the silane graft resin is prepared as a reaction composition. The synthesized silane graft resin will also be referred to as silane cross-linkable resin. The silane cross-linkable resin composition contains silane graft resin in which the silane coupling agent is grafted to base resin to such an extent that molding can be performed in the process (2) to be described later.

In the process (1), components can also be melt-mixed (will also be referred to as melt kneading or kneading) at one time, but it is preferable to melt mix the above-described components by the following processes (1-1) and (1-2).

Process (1-1): process of melt mixing the above-described base resin, the above-described silane coupling agent, and preferably an inorganic filler at a temperature equal to or larger than a decomposition temperature of an organic peroxide in the presence of the organic peroxide Process (1-2): process of preparing a silane cross-linkable resin composition by melt mixing silane master batch and silanol condensation catalyst By the melt mixing of the process (1-1), base resin and silane coupling agent are grafted. In this manner, a silane master batch (silane MB) including silane graft resin is prepared. The silane MB contains silane graft resin in which the silane coupling agent is grafted to base resin to such an extent that molding can be performed in the process (2) to be described later.

In the process (1-1), a mixing order of each component is not specifically limited, the components may be mixed in any order, and the above-described components can also be melt-mixed at one time. In this case, it is preferable to melt mix the above-described components after preliminarily dry blending the components. Method and conditions to be described in the following processes (1-1a) and (1-1b) can be employed as methods and conditions of dry blend and melt mixing.

In a preparation method of the silane cross-linkable resin composition, subsequently, a process (1-2) of melt mixing the silane MB and the silanol condensation catalyst is performed.

In the process (1-2), in a case where part of base resin is melt-mixed in the above-described process (1-1) or the following process (1-1b), a mixture (catalyst master batch) with carrier resin can be used as silanol condensation catalyst. The catalyst master batch (catalyst MB) can be prepared by melt mixing a remnant of base resin and the silanol condensation catalyst, for example. A melt mixing method used at this time is only required to be a method of performing melt mixing by melting carrier resin, and melt mixing can be performed similarly to melt mixing of the above-described process (1-1b), for example. A mixing temperature can be set to 80 to 250° C., for example, and more preferably, 100 to 240° C.

A mixing method of silane MB and silanol condensation catalyst or catalyst MB is only required to be a method of performing mixing by melting base resin, and mixing can be performed similarly to melt mixing of the process (1-1b), for example. A mixing temperature can be set to 80 to 250° C., for example, and more preferably, 100 to 240° C.

A composition amount of silanol condensation catalyst is as described above.

In this process, resin other than base resin, an inorganic filler, and the like can be mixed.

In this manner, a silane cross-linkable resin composition is obtained as a melt mixture of silane MB and silanol condensation catalyst or catalyst MB. The silane cross-linkable resin composition is non-cross-linked composition in which a hydrolyzable silyl group derived from silane coupling agent is not subjected to silanol condensation. Actually, by melt mixing of the process (1-2), partial cross-linking (local cross-linked) is inevitable, but it is preferable to keep moldability in the process (2) to be described later.

In a preparation method of a silane cross-linkable resin composition, in the case of using an inorganic filler, it is preferable to mix components in two steps corresponding to the following processes (1-1a) and (1-1b), as the process (1-1).

Process (1-1a): process of preparing a mixture by preliminarily mixing the inorganic filler and silane coupling agent Process (1-1b): process of melt mixing the mixture obtained by the process (1-1a) and base resin at a temperature equal to or larger than a decomposition temperature of an organic peroxide in the presence of the organic peroxide In the above-described process (1-1) or (1-1b), all of base resin can be melt mixed, but it is preferable that part is melt mixed, and the remnant is melt mixed as carrier resin in the above-described process (1-2). In this case, the base resin 100 mass part means a total composition amount of base resin blended in the process (1-1) or process (1-1b), and base resin blended in the process (1-2). Part of base resin to be blended is preferably 50 to 98 mass %, and the remnant is preferably 2 to 50 mass % with respect to the total amount.

In the process (1-1a), a method of preliminarily mixing the inorganic filler and silane coupling is not specifically limited, and may be wet mixing or dry mixing. In the present invention, it is preferable to use dry mixing (dry blend) of adding and mixing silane coupling agent into an inorganic filler by heating or without heating. A mixing temperature can be preferably set to 10 to 60° C., and more preferably a temperature near room temperature (25° C.) (for example, 20 to 35° C.). The condition can be set to a condition of about several minutes to several hours.

By the mixing, an inorganic filler having silane coupling agent being bonded or stuck by strong bonding (via hydrolyzable silyl group that is silanol condensable) in a surface of the inorganic filler (region where chemical bonding can occur), and an inorganic filler having silane coupling agent being bonded or stuck by weak bonding to a surface of the inorganic filler can be prepared. The weak bonding includes mutual action caused by hydrogen bonding, mutual action between ions, partial charges, or dipoles, action caused by sticking, and the like, and the strong bonding includes chemical bonding with a region that can perform chemical bonding on the inorganic filler surface, and the like. By the bonding, volatilization of silane coupling agent can be reduced in melt mixing in the subsequent processes (1-1b) and (1-2).

In the process (1-1a) and the like, organic peroxide may exist as long as mixing is performed at a temperature smaller than the decomposition temperature of the organic peroxide, and base resin may exist.

Subsequently, mixture obtained in the process (1-1a), base resin (all or part), and remaining components not mixed in the process (1-1a) are melt mixed at a temperature equal to or larger than a decomposition temperature of an organic peroxide in the presence of the organic peroxide (process (1-1b)).

The organic peroxide is only required to exist when the process (1-1b) is performed, and may be mixed in the process (1-1a) or may be mixed in the process (1-1b). A composition amount of the organic peroxide is not specifically limited, but preferably 0.01 to 0.6 mass part, and more preferably, 0.05 to 0.3 mass part with respect to the base resin 100 mass part.

In the process (1-1b), a temperature at which the above-described component is melt mixed is a temperature equal to or larger than the decomposition temperature of the organic peroxide, preferably a temperature of the decomposition temperature of the organic peroxide+(25 to 110)° C., and is a temperature from 150 to 230° C., for example. Other melt mixing conditions such as a mixing time, for example, can be appropriately set. Thus, organic peroxide is decomposed, acts on silane coupling agent, and a grafting reaction of silane coupling agent to base resin progresses.

A mixing method is not specifically limited as long as the method is a method normally used for rubber, plastic, and the like. A mixing device is appropriately selected in accordance with a composition amount of an inorganic filler, for example. As mixing devices, a uniaxial extruding machine, a biaxial extruding machine, a roll, a banbury mixer or various kneaders, and the like are used. From the aspect of dispersibility of resin components and stability of cross-linking reaction, sealed mixers such as banbury mixer or various kneaders are preferable.

By performing the process (1-1b) in this manner, base resin and silane coupling agent are grafted. In this manner, a silane MB including silane graft resin is prepared.

In the above-described process (1-1a) that uses the inorganic filler, silane coupling agent is bonded with or stuck to a region that can perform chemical bonding of the inorganic filler, using the hydrolyzable silyl group. Furthermore, the grafting reaction region of the silane coupling agent is grafted to the grafting reactive region of base resin in melt mixing in the above-described process (1-1b). As a grafting reaction pattern, a pattern in which silane coupling agent bonded or stuck to the inorganic filler by weak bonding is detached from the inorganic filler and grafted to base resin, a pattern in which silane coupling agent bonded or stuck to the inorganic filler by strong bonding is grafted to base resin in a state in which bonding with the inorganic filler is kept, and the like are included.

Subsequently, by performing the above-described process (1-2), a silane cross-linkable resin composition is prepared.

In the preparation method of the silane cross-linkable resin composition, in the process (1-1) and particularly in the process (1-1b), it is preferable to suppress condensation reaction of silane coupling agent by performing melt mixing in the absence of silanol condensation catalyst (for example, a percentage of 0.01 mass part or less with respect to a resin composition 100 mass part).

In the cable manufacturing method using the silane cross-linking method, subsequently, the process (2) of arranging the silane cross-linkable resin composition on the outer circumferential surface of the conductor core is performed.

The process (2) is only required to be a method that can cover the conductor core with the silane cross-linkable resin composition, and an appropriate molding method is applied. For example, as molding methods, extrusion molding that uses an extruding machine, injection molding that uses an injection molding machine, and molding that uses another molding machine are included. In the present invention, an extrusion molding that coextrudes the conductor core and the silane cross-linkable resin composition is preferable.

Extrusion molding can be performed using a general extrusion molding machine. An extrusion molding temperature is appropriately set in accordance with the type of base resin or carrier resin and various conditions of extrusion speed (drawing speed). For example, the extrusion molding temperature can be preferably set to 80 to 250° C.

In the process (2), adhesion force between the conductor core and the sheath can be appropriately controlled by bracing the outer circumferential surface of the conductor core using powdered skid such as talc, liquid skid such as silicone, and furthermore, a tape or the like. The cross-sectional shape and the thickness of the sheath can be adjusted using a ferrule having an appropriate structure.

It is preferable to execute the process (2) simultaneously with the process (1-2) or consecutively. For example, a series of processes of melt mixing the silane MB and the silanol condensation catalyst (or catalyst MB) within a covering device, and subsequently, performing extrusion molding to the outer circumferential surface of the conductor core can be employed.

Precedential to melt mixing in the process (2) or the process (1-1b), each MB can be mixed by dry blend, for example, without melting base resin or carrier resin. A method and a condition of dry blend are not specifically limited, and for example, dry mixing and a condition thereof in the process (1-1a) are included.

In the process (2), for avoiding silanol condensation reaction, it is preferable to avoid keeping a high-temperature state for a long time in a state in which silane MB and silanol condensation catalyst are mixed.

In the cable manufacturing method using the silane cross-linking method, subsequently, the process (3) of cross-linking the silane cross-linkable resin composition in contact with water is performed. In this manner, silanol (OH group bonded to silicon atom) is obtained by hydrolyzing the hydrolyzable silyl group of silane coupling agent, and hydroxyl groups of silanol are condensed by silanol condensation catalyst existing in the silane cross-linkable resin composition.

The process (3) can be performed by a normal method. The above-described condensation reaction progresses at normal temperature in the presence of silanol condensation catalyst. Thus, there is no need to actively bring the silane cross-linkable resin composition arranged on the outer circumferential surface of the conductor core, into contact with water. For promoting the cross-linked reaction, it is also possible to bring the silane cross-linkable resin composition into contact with moisture. For example, a method of actively bringing into contact with water such as exposure to high humidity atmosphere, immersion into hot water, injection into a wet and hot bath, and exposure to hot-temperature water vapor can be employed. In addition, at this time, pressure may be applied for osmosing moisture.

In this process, silane coupling agent strongly bonded with the inorganic filler is less likely to have a silanol condensation reaction, and enables strong adhesion (high affino) of base resin and the inorganic filler by maintaining bonding with the inorganic filler. On the other hand, silane coupling agent weakly bonded with the inorganic filler has a silanol condensation reaction and cross-links base resins via silanol bonding (siloxane bonding).

In this manner, the processes (1) to (3) are executed, and a sheath including silane cross-linked material of silane cross-linkable resin composition is formed on the outer circumferential surface of the conductor core.

The silane cross-linked material is obtained by cross-linking hydrolyzable silyl groups of silane coupling agent bonded to silane graft resin, by silanol condensation as for silane graft resin obtained by grafting a specific amount of silane coupling agent to base resin including ethylene rubber or styrene elastomer. The silane graft resin includes cross-linked resin in which base resins are bonded via silane coupling agent (siloxane bonding).

The silanol condensation hardened material of silane cross-linkable resin composition containing an inorganic filler includes at least two types of cross-linked resins corresponding to bonding force of the inorganic filler and silane coupling agent in the above-described process (1-1a), that is to say, includes cross-linked resin in which base resin is bonded (cross-linked) to the inorganic filler via silane coupling agent, in addition to the above-described cross-linked resin.

The silane cross-linked material includes, as constituents, a constituent derived from at least one of ethylene rubber and styrene elastomer, a constituent derived from silane coupling agent, and preferably, a constituent derived from an inorganic filler.

The description in JP-A-2017-145370 ("JP-A" means an unexamined published Japanese patent application), for example, can be appropriately applied to each process in the above-described manufacturing method, and furthermore, reaction in the silane cross-linking method and the resultant condensation hardened material, and the description in JP-A-2017-145370 can be incorporated as a part of the description in this specification.

EXAMPLES

Hereinafter, the present invention will be described in more detail based on examples, but the present invention is not limited to these.

In Table 1, a numerical value regarding a composition amount in each example indicates a mass part unless otherwise stated. In addition, in each component field, "−" means that a composition amount of a corresponding component is 0 mass part.

The details of each component (compound) listed in Table 1 are given below.

<Base Resin>
—Ethylene Rubber—
Mitsui 3092M: product name, ethylene-propylene-diene rubber, made by Mitsui Chemicals, Inc.
NODEL 3720P: product name, ethylene-propylene-ethylidene norbornene rubber (EPDM), made by The Dow Chemical Company
—Styrene Elastomer—
SEPTON 4077: product name, SEPS, made by Kuraray Co., Ltd.
TUFTEC (registered trademark) N504: product name, SEBS, made by Asahi Kasei Corporation
—Polyolefin Series Resin—
Evolue SP1540: product name, LLDPE, made by Prime Polymer Co., Ltd.)
—Organic Mineral Oil—
Diana Process PW-90: product name, paraffinic oil, made by Idemitsu Kosan Co., Ltd.
SUNTHENE410: product name, naphthenic oil, made by JAPAN SUN OIL COMPANY, LTD.
—Other Resin—
RESAMINE P2288: product name, polyurethane, made by Dainichiseika Color & Chemicals Mfg. Co., Ltd.
Vamac DP: product name, acrylic rubber, made by DuPont de Nemours, Inc.
SKYPREN E-33: product name, chloroprene rubber, made by Tosoh Corporation
<Inorganic Filler>
Magnesium hydroxide: MAGSEEDS LN-6 (product name), made by Konoshima Chemical Co., Ltd.
<Silane Coupling Agent>
KBM-1003: product name, vinyl trimethoxysilane, made by Shin-Etsu Chemical Co., Ltd.

<Organic Peroxide>
PERHEXA 25B: product name, 2,5-dimethyl-2,5-di(tert-butylperoxy)hexane, decomposition temperature 154° C., made by NOF Corporation
<Silanol Condensation Catalyst>
ADK STAB OT-1: product name, dioctyltin dilaurate, made by ADEKA CORPORATION
<Cross-Linking Auxiliary Agent>
Ogmont T200: product name, trimethylolpropane tri methacrylate, made by SHIN-NAKAMURA CHEMICAL Co., Ltd.
NK ester 3G: product name, methacrylate series cross-linking auxiliary agent, made by SHIN-NAKAMURA CHEMICAL Co., Ltd.
<Manufacturing of Conductor Core>

First of all, a twisted wire of thin electric wires (twisting rate of 1%) was obtained by twisting together two cross-linked polyethylene electric wires having a conductor cross-sectional area of 0.25 SQ (thin electric wire: conductor outer diameter of 1.4 mm, resin layer thickness of 0.3 mm). A conductor core (twisting rate of 1.5%, twisting rate of thin electric wires is about 2.5% in total) illustrated in FIG. 1 was manufactured twisting together the obtained twisted wire of thin electric wires and two cross-linked polyethylene electric wires with a conductor cross-sectional area of 1.8 SQ (thick electric wire: conductor outer diameter of 2.6 mm, resin layer thickness of 0.3 mm).

Example 1

As described below, a sheath was formed by electron beam cross-linking, and a four-core composite cable illustrated in FIG. 1 was manufactured.

As indicated in the field of Example 1 in Table 1, components were input to the banbury mixer, melt mixed at 120 to 200° C. for ten minutes, and then discharged at a material discharge temperature of 200° C., and a pellet of resin composition was obtained through the feeder ruder.

Using the prepared conductor core and the obtained pellet, the sheath was formed as follows. More specifically, the obtained pellet was introduced into the extruding machine including a screw having a diameter of 90 mm (ratio between screw effective length L and diameter D: L/D=24, compression section screw temperature: 190° C., head temperature: 200° C.). A cable with an outer diameter of 8 mm was obtained by directly extruding (arranging) the resin composition to the outer circumferential surface of the conductor core with a thickness of 1 mm while melting the pellet in the extruding machine.

Subsequently, electron beams were emitted to the resin composition arranged on the outer circumferential surface of the conductor core, under an acceleration voltage 500 kV condition.

In this manner, the composite cable (outer diameter: 8 mm) of Example 1 including the sheath having a layer thickness of 1 mm and formed by electron beam cross-linked material was manufactured.

Examples 2 and 3

Composite cables of Example 2 and 3 were manufactured similarly to Example 1 except that resin compositions were prepared using compositions listed in the respective example fields in Table 1.

In the following examples, in the case of forming a sheath using the silane cross-linking method, as base resin, 95 mass % of total 100 mass % listed in each example field in Table 1 was used for preparation of silane MB, and remaining 5 mass % was used for preparation of catalyst MB.

Example 4

As described below, a sheath was formed by the silane cross-linking method, and a four-core composite cable illustrated in FIG. 1 was manufactured.
(Preparation of Silane MB)

Silane coupling agent and organic peroxide were mixed (dry blende) at 25° C. at a contained amount listed in Example 4 field in Table 1, and subsequently, the inorganic filler was input thereto and mixed (dry blende) at 30° C. (process (1-1a)). Subsequently, the obtained mixture and base resin were input into the banbury mixer at a composition amount listed in Example 4 field in Table 1 (excluding remnant used as carrier resin), melt mixed at 120 to 200° C. for ten minutes, and then discharged at a material discharge temperature of 200° C., and a pellet of silane MB was obtained through the feeder ruder (process (1-1b)).

Silane grafting reaction was caused by melt mixing in the above-described banbury mixer, and silane graft resin was synthesized.
(Preparation of Catalyst MB)

Carrier resin (remnant in composition amount listed in Example 4 field in Table 1) and silanol condensation catalyst at a composition amount listed in Example 4 field in Table 1 was input into the banbury mixer and melt mixed at 170° C., and then discharged at a material discharge temperature of 180° C., and a pellet of catalyst MB was obtained through the feeder ruder.
(Extrusion Covering)

Subsequently, the prepared silane MB pellet and catalyst MB pellet were dry blended at a composition percentage listed in Example 4 field in Table 1. The obtained dry blended material was introduced into the extruding machine including a screw having a diameter of 90 mm (ratio between screw effective length L and diameter D: L/D=24, compression section screw temperature: 190° C., head temperature: 200° C.). By directly extruding (arranging) the dry blended material onto the outer circumferential surface of the twisted conductor core at a thickness of 1 mm while melt mixing the dry blended material (preparing silane cross-linkable resin composition) within the extruding machine, a coated conductor with an outer diameter of 8 mm was obtained (process (1-2) and process (2)).
(Silanol Condensation Reaction)

The obtained coated conductor was left in atmosphere with the temperature of 60° C. and the relative humidity of 95% for 24 hours, and brought into contact with water (process (3)).

In this manner, the composite cable (outer diameter: 8 mm) of Example 4 including the sheath having a layer thickness of 1 mm and formed by silane cross-linked material was manufactured.

Examples 5 to 10, 12 to 18, and Comparative Examples 2 to 5

Composite cables were manufactured similarly to Example 4 except that silane MB and catalyst MB are prepared using compositions listed in each example field or each comparative example field in Table 1 or Table 2.

Nevertheless, in Example 13 and Comparative Examples 2 to 4, the process (1-1b) was performed without performing the process (1-1a).

Example 11

The composite cable (outer diameter: 8 mm) of Example 11 including the sheath having a layer thickness of 1 mm and formed by non-cross-linked resin composition was manufactured similarly to Example 1 except that electron beams were not emitted to the resin composition arranged on the outer circumferential surface of the conductor core.

Comparative Example 1

The composite cable of Comparative Example 1 including the sheath having a layer thickness of 1 mm and formed by electron beam cross-linked material was manufactured similarly to Example 1 except that the resin composition with the composition listed in Comparative Example 1 field in Table 2 was prepared.

The manufactured composite cables of Examples and Comparative Examples are four-core composite cables in which thick electric wires are used as EPB cables (power wires) and thin electric wires are used as ABS cables (signal wires).

Reference Example

As Reference Example, a two-core ABS cable was manufactured.

A conductor core including a twisted wire of thin electric wires (twisting rate of 2%) was obtained by twisting together two cross-linked polyethylene electric wires (thin electric wires) having a conductor cross-sectional area of 0.25 SQ.

Subsequently, using the conductor core, the composite cable (outer diameter: 5 mm) of Reference Example including the sheath having a layer thickness of 1 mm and formed by electron beam cross-linked material was manufactured similarly to Example 1 except that the resin composition with the composition listed in Reference Example field in Table 2 was prepared.

The following evaluation was conducted for the manufactured cables and the results are listed in Table 1.
<Flexibility Test>

A ring-shaped test body was obtained by cutting each of the manufactured cables into a length of 600 mm and connecting both end portions. The ring-shaped test body was arranged with its central axis being horizontal, a weight (load 2 kgf: 19.6N) with a latchkey was attached to the bottom portion of the ring-shaped test body by being engaged using the latchkey, and was deformed into an ellipse extending in a vertical direction. When the weight was attached, initial speed was not applied to the bottom portion (lowermost end) of the ring-shaped test body.

Flexibility was evaluated by measuring a value of a minor axis (short axis inner diameter of ellipse) of a test specimen deformed into an ellipse by attaching the weight in this manner.

The evaluation was performed by determining a standard of the following standards that includes the value of the minor axis, and a rank equal to or higher than rank D is regarded as acceptance of this test.

A: 7.5 mm or less
B: More than 7.5 mm, 10.0 mm or less
C: More than 10.0 mm, 12.5 mm or less
D: More than 12.5 mm, 15.0 mm or less
E: More than 15.0 mm <Flex Resistance Test>

Figure 2:
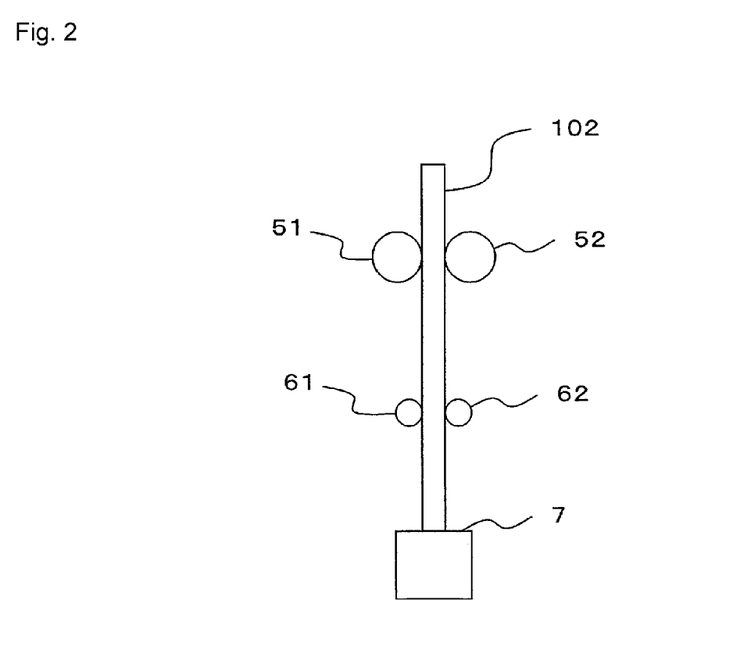
FIG. 2 is a schematic diagram illustrating a simple overview of a device to be used in a bending resistance test in an Example.

FIG. 2 is a schematic diagram illustrating a simple overview of a device to be used in this test viewed from an axial direction of a mandrel.

As illustrated in FIG. 2, a cable 102 is extended vertically between two mandrels 51 and 52, which are arranged horizontally and parallel to each other, and vibration prevention retainers 61 and 62, and a weight 7 is attached to a lower part of the cable 102. In this state, an upper end of the cable 102 was bent in such a manner as to alternately contact (repeatedly contact the left and right alternately) upper outer circumferences of the left and right mandrels 51 and 52. The number of bendings was counted assuming that the cable 102 bent in such a manner as to contact the outer circumference of either of the left and right mandrels 51 and 52 is counted as one bending. The test was performed at the atmosphere of 25° C. by adjusting a bent length in such a manner that an upper side surface of the cable 102 contacts an upper outer circumference of each mandrel under the following test condition: mandrel diameter of 10 mm, left-right bending angle of 90°, speed of 60 bendings/minute, weight of 500 g, 1-mm clearance between the cable and each mandrel. The number of bendings until wire break occurs by supplying power after connecting the cable in a loop shape in series.

The evaluation was performed by determining a standard of the following standards that includes the number of bendings until wire break occurs, and a rank equal to or higher than rank C is regarded as acceptance of this test.
  A: 100 thousands of times or more
  B: 70 thousands of times or more, less than 100 thousands of times
  C: 50 thousands of times or more, less than 70 thousands of times
  D: less than 50 thousands of times <Abrasion Resistance Test>

Using an abrasion testing machine and an abrasion tape defined in JASO D 618, an abrasion tape length used until the sheath of the cable completely abrades away, and the abrasion tape contacts the conductor core was measured. The load was set to 0.45 kgf (4.4 N).

The evaluation was performed by determining a standard of the following standards that includes the abrasion tape length, and a rank equal to or higher than rank C is regarded as acceptance of this test.
  A: 20 m or more
  B: 10 m or more, less than 20 m
  C: 5 m or more, less than 10 m
  D: less than 5 m <Low-Temperature Property Test>

The cable was put into a constant-temperature bath of −40° C., winded around a mandrel having the same outer diameter as the cable, and breaking of the sheath was confirmed.

The test result is indicated assuming that a case where breaking has not generated (cannot confirmed) in the sheath is "o" (acceptable) and a case where breaking has generated is "x" (unacceptable).

<Reference Test>

Heat resistance and terminal workability of cables manufactured in Examples and Comparative Examples were evaluated by the following reference test.

The heat resistance and terminal workability are preferred cable properties demanded in accordance with the use application.

(Heat Resistance Test)

The cable was winded around a mandrel having the same outer diameter as the cable, put into a constant-temperature bath of 250° C. for 30 minutes, and breaking of the sheath was confirmed.

The test result is indicated assuming that a case where breaking has not generated (cannot confirmed) in the sheath is "o" (acceptable in this test) and a case where breaking has generated is "x" (unacceptable in this test).

(Terminal Workability Test)

At an end portion 100 mm of the cable, a peeling property in peeling off the sheath was evaluated.

Specifically, a slit extending around the composite cable thoroughly in the circumferential direction vertical to an axial direction of the composite cable is made at the depth of 90% of a covering thickness of the composite cable. Subsequently, while holding the sheath of one side of the composite cable across the slit, the composite cable on the other side was pulled out.

As for the composite cable pulled out in this manner, a terminal workability test of the sheath was evaluated based on the following standards. Acceptance in this reference test is "Δ".

"o": a case where the pulled-out cable does not include a remaining portion of the sheath to be pulled out, and a length of a sheath end portion of the pulled-out cable is less than 1.0 mm "Δ": a case where the pulled-out cable does not include a remaining portion of the sheath to be pulled out, and a length of a sheath end portion of the pulled-out cable is 1.0 mm or more and 5 mm or less "x": a case where the pulled-out cable includes a remaining part of the sheath to be pulled out

[Table 1]

TABLE 1

| | | Ex. 1 | Ex. 2 | Ex. 3 | Ex. 4 | Ex. 5 | Ex. 6 | Ex. 7 |
|---|---|---|---|---|---|---|---|---|
| | Number of cores of composite cable | Four-core | Four-core | Four-core | Four-core | Four-core | Four-core | Four-core |
| Base resin | Mitsui 3092M (EP rubber) | 20 | 20 | 20 | 20 | — | 20 | 40 |
| | NODEL 3720P (EP rubber) | — | — | — | — | 20 | — | — |
| | SEPTON 4077 (styrene elastomer) | 20 | 20 | 20 | 20 | 20 | — | — |
| | TUFTEC N504 (styrene elastomer) | — | — | — | — | — | 20 | — |
| | Diana Process Oil PW-90 (organic mineral oil) | 30 | 30 | 30 | 30 | 30 | 30 | 30 |
| | SUNTHENE 410 (organic mineral oil) | — | — | — | — | — | — | — |

TABLE 1-continued

|  |  | | | | | | | |
|---|---|---|---|---|---|---|---|---|
|  | RESAMINE P2288 (polyurethane) | — | — | — | — | — | — | — |
|  | Evolue SP1540 (LLDPE) | 30 | 30 | 30 | 30 | 30 | 30 | 30 |
|  | Vamac DP (acrylic rubber) | — | — | — | — | — | — | — |
|  | SKYPREN E-33 (chloroprene rubber) | — | — | — | — | — | — | — |
| Inorganic filler | Magnesium hydroxide | 60 | 60 | 60 | 60 | 60 | 60 | 60 |
| Cross-linking auxiliary agent | Ogmont T200 | — | 5 | — | — | — | — | — |
|  | NK ester 3G | — | — | 1 | — | — | — | — |
|  | KBM-1003 (silane coupling agent) | — | — | — | 5 | 5 | 5 | 5 |
|  | PERHEXA 25B (organic peroxide) | — | — | — | 0.05 | 0.05 | 0.05 | 0.05 |
|  | ADK STAB OT-1 (silanol condensation catalyst) | — | — | — | 0.1 | 0.1 | 0.1 | 0.1 |
|  | Ratio $C_E$:$C_O$ of content percentages | 57:43 | 57:43 | 57:43 | 57:43 | 57:43 | 57:43 | 57:43 |
|  | Cross-linking method | Electron beam cross-linking | Electron beam cross-linking | Electron beam cross-linking | Silane cross-linking | Silane cross-linking | Silane cross-linking | Silane cross-linking |
| Evaluation | Flexibility test | A | A | A | A | A | A | A |
|  | Flex resistance test | A | A | A | A | A | A | A |
|  | Abrasion resistance test | A | A | A | A | A | A | A |
|  | Low-temperature property test | ○ | ○ | ○ | ○ | ○ | ○ | ○ |
|  | Heat resistance test | ○ | ○ | ○ | ○ | ○ | ○ | ○ |
|  | Terminal workability test | ○ | ○ | ○ | ○ | ○ | ○ | ○ |

Remarks: 'Ex.' means Example according to this invention.

|  |  | Ex. 8 | Ex. 9 | Ex. 10 | Ex. 11 | Ex. 12 | Ex. 13 | Ex. 14 |
|---|---|---|---|---|---|---|---|---|
|  | Number of cores of composite cable | Four-core | Four-core | Four-core | Four-core | Four-core | Four-core | Four-core |
| Base resin | Mitsui 3092M (EP rubber) | — | 10 | 25 | 20 | 20 | 20 | 20 |
|  | NODEL 3720P (EP rubber) | — | — | — | — | — | — | — |
|  | SEPTON 4077 (styrene elastomer) | 40 | — | 25 | 20 | 20 | 20 | 20 |
|  | TUFTEC N504 (styrene elastomer) | — | — | — | — | — | — | — |
|  | Diana Process Oil PW-90 (organic mineral oil) | 30 | 7.5 | 37.5 | 30 | — | 30 | 30 |
|  | SUNTHENE 410 (organic mineral oil) | — | — | — | — | — | — | — |
|  | RESAMINE P2288 (polyurethane) | — | — | — | — | — | — | — |
|  | Evolue SP1540 (LLDPE) | 30 | 82.5 | 12.5 | 30 | 60 | 30 | 30 |
|  | Vamac DP (acrylic rubber) | — | — | — | — | — | — | — |
|  | SKYPREN E-33 (chloroprene rubber) | — | — | — | — | — | — | — |
| Inorganic filler | Magnesium hydroxide | 60 | 60 | 60 | 60 | 60 | — | 170 |
| Cross-linking auxiliary agent | Ogmont T200 | — | — | — | — | — | — | — |
|  | NK ester 3G | — | — | — | — | — | — | — |
|  | KBM-1003 (silane coupling agent) | 5 | 5 | 5 | — | 5 | 5 | 5 |
|  | PERHEXA 25B (organic peroxide) | 0.05 | 0.05 | 0.05 | — | 0.05 | 0.05 | 0.05 |
|  | ADK STAB OT-1 (silanol condensation catalyst) | 0.1 | 0.1 | 0.1 | — | 0.1 | 0.1 | 0.1 |
|  | Ratio $C_E$:$C_O$ of content percentages | 57:43 | 57:43 | 57:43 | 57:43 | 100:0 | 57:43 | 57:43 |
|  | Cross-linking method | Silane cross-linking | Silane cross-linking | Silane cross-linked | non cross-linking | Silane cross-linking | Silane cross-linking | Silane cross-linking |
| Evaluation | Flexibility test | A | C | A | A | C | A | D |
|  | Flex resistance test | A | B | A | A | B | A | C |
|  | Abrasion resistance test | A | A | A | B | B | A | B |
|  | Low-temperature property test | ○ | ○ | ○ | ○ | ○ | ○ | ○ |
|  | Heat resistance test | ○ | ○ | ○ | x | ○ | ○ | ○ |
|  | Terminal workability test | ○ | ○ | ○ | ○ | ○ | Δ | ○ |

Remarks: 'Ex.' means Example according to this invention.

TABLE 2

|  |  | Ex. 15 | Ex. 16 | Ex. 17 | Ex. 18 |
|---|---|---|---|---|---|
|  | Number of cores of composite cable | Four-core | Four-core | Four-core | Four-core |
| Base resin | Mitsui 3092M (EP rubber) | 20 | 20 | 20 | 20 |
|  | NODEL 3720P (EP rubber) | — | — | — | — |
|  | SEPTON 4077 (styrene elastomer) | 20 | 20 | 20 | 20 |
|  | TUFTEC N504 (styrene elastomer) | — | — | — | — |
|  | Diana Process Oil PW-90 (organic mineral oil) | 30 | 30 | 30 | 30 |
|  | SUNTHENE 410 (organic mineral oil) | — | — | — | — |
|  | RESAMINE P2288 (polyurethane) | — | — | — | — |
|  | Evolue SP1540 (LLDPE) | 30 | 30 | 30 | 30 |
|  | Vamac DP (acrylic rubber) | — | — | — | — |
|  | SKYPREN E-33 (chloroprene rubber) | — | — | — | — |
| Inorganic filler | Magnesium hydroxide | 60 | 60 | 60 | 60 |
| Cross-linking auxiliary agent | Ogmont T200 | — | — | — | — |
|  | NK ester 3G | — | — | — | — |
|  | KBM-1003 (silane coupling agent) | 15 | 1 | 5 | 5 |
|  | PERHEXA 25B (organic peroxide) | 0.2 | 0.05 | 0.05 | 0.05 |
|  | ADK STAB OT-1 (silanol condensation catalyst) | 0.1 | 0.1 | 0.01 | 0.4 |
|  | Ratio $C_E:C_O$ of content percentages | 57:43 | 57:43 | 57:43 | 57:43 |
|  | Cross-linking method | Silane cross-linking | Silane cross-linking | Silane cross-linking | Silane cross-linking |
| Evaluation | Flexibility test | A | A | A | A |
|  | Flex resistance test | A | A | A | A |
|  | Abrasion resistance test | A | A | A | A |
|  | Low-temperature property test | ○ | ○ | ○ | ○ |
|  | Heat resistance test | ○ | ○ | ○ | ○ |
|  | Terminal workability test | ○ | ○ | ○ | ○ |

Remarks: 'Ex.' means Example according to this invention.

|  |  | CEx. 1 | CEx. 2 | CEx. 3 | CEx. 4 | CEx. 5 | Reference Example |
|---|---|---|---|---|---|---|---|
|  | Number of cores of composite cable | Four-core | Four-core | Four-core | Four-core | Four-core | 2 cores |
| Base resin | Mitsui 3092M (EP rubber) | — | — | — | — | 40 | — |
|  | NODEL 3720P (EP rubber) | — | — | — | — | — | — |
|  | SEPTON 4077 (styrene elastomer) | — | — | — | — | 20 | — |
|  | TUFTEC N504 (styrene elastomer) | — | — | — | — | — | — |
|  | Diana Process Oil PW-90 (organic mineral oil) | — | — | — | — | 30 | — |
|  | SUNTHENE 410 (organic mineral oil) | — | — | — | 10 | — | — |
|  | RESAMINE P2288 (polyurethane) | 100 | — | — | — | — | 100 |
|  | Evolue SP1540 (LLDPE) | — | 100 | 50 | — | 10 | — |
|  | Vamac DP (acrylic rubber) | — | — | 50 | — | — | — |
|  | SKYPREN E-33 (chloroprene rubber) | — | — | — | 90 | — | — |
| Inorganic filler | Magnesium hydroxide | — | — | — | — | 60 | — |
| Cross-linking auxiliary agent | Ogmont T200 | 5 | — | — | — | — | 5 |
|  | NK ester 3G | — | — | — | — | — | — |
|  | KBM-1003 (silane coupling agent) | — | 5 | 5 | 5 | 5 | — |
|  | PERHEXA 25B (organic peroxide) | — | 0.05 | 0.1 | 0.03 | 0.05 | — |
|  | ADK STAB OT-1 (silanol condensation catalyst) | — | 0.1 | 0.1 | 0.1 | 0.1 | — |
|  | Ratio $C_E:C_O$ of content percentages | — | — | — | — | 57:43 | — |

TABLE 2-continued

|  |  | Cross-linking method | Electron beam cross-linking | Silane cross-linking | Silane cross-linking | Silane cross-linking | Silane cross-linking | Electron beam cross-linking |
|---|---|---|---|---|---|---|---|---|
| Evaluation | Flexibility test |  | E | E | A | A | A | A |
|  | Flex resistance test |  | D | D | A | A | A | A |
|  | Abrasion resistance test |  | A | A | D | B | D | B |
|  | Low-temperature property test |  | ○ | ○ | ○ | x | ○ | ○ |
|  | Heat resistance test |  | ○ | ○ | ○ | ○ | ○ | ○ |
|  | Terminal workability test |  | ○ | ○ | Δ | Δ | Δ | ○ |

Remarks: 'CEx.' means Comparative Example.

As listed in Table 1 and Table 2, it can be seen that, if a sheath formed by a resin composition including base resin containing at least one type of ethylene rubber and styrene elastomer at 10 to 50 mass % is included on the outer surface of a conductor core, a composite cable has high level of abrasion resistance, a low-temperature property, flexibility, and flex resistance.

More specifically, if base resin including resin or rubber (polyurethane, acrylic rubber, or chloroprene rubber) other than ethylene rubber and styrene elastomer is used, any of the above-described four properties deteriorates, and sufficient properties are not obtained. In addition, because an ABS cable in Reference Example has a small outer diameter of 5 mm, the composite cable of Reference Example has passed the flexibility test and the flex resistance test, but the composite cable (outer diameter: 8 mm) of Comparative Example 1 in which the sheath was formed by the same material has failed in both of the flexibility test and the flex resistance test, and a significant decline in property was observed.

In view of this, if base resin including a specific amount of ethylene rubber and styrene elastomer is used, by the composite of the wire, even if an outer diameter is increased to a large diameter of 8 mm, the above-described four properties can be improved to excellent level. In particular, if a sheath is formed by cross-linked material of a resin composition (particularly, silane cross-linked material), the above-described four properties can be further improved to higher levels. Moreover, a composite cable having high heat resistance can be obtained.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2019-061382 filed in Japan on Mar. 27, 2019, which is herein incorporated by reference as a part of the present specification.

REFERENCE SIGNS LIST

1 Composite cable
2 Thick electric wire
21 Conductor
22 Resin layer
3 Thin electric wire
31 Conductor
32 Resin layer
4 Sheath
51, 52 Mandrel
61, 62 Vibration prevention retainer
7 Weight
102 Cable

The invention claimed is:

1. A composite cable comprising:
a sheath; and
a core,
wherein:
the sheath surrounds an outer surface of the core;
the sheath is a single layer or an outermost layer of the composite cable;
the core includes at least a plurality of thick electric wires, each having a resin layer on an outer circumference of a conductor, and a plurality of thin electric wires, each having a resin layer on the outer circumference of the conductor, and
the sheath includes a resin composition including a base resin, said base resin containing an ethylene rubber and a styrene elastomer, wherein a total content of the ethylene rubber and the styrene elastomer is 10 to 50 mass %.

2. The composite cable according to claim 1, wherein the sheath includes cross-linked material of the resin composition.

3. The composite cable according to claim 1, wherein the base resin contains organic mineral oil.

4. The composite cable according to claim 3, wherein a ratio ($C_E$:$C_O$) between a content percentage ($C_E$) of the ethylene rubber and the styrene elastomer, and a content percentage ($C_O$) of the organic mineral oil is 50:50 to 75:25.

5. The composite cable according to claim 1, wherein the resin composition contains an inorganic filler with a 10 to 150 mass part with respect to a base resin 100 mass part.

6. The composite cable according to claim 5, wherein the inorganic filler is at least one type selected from the group consisting of silica, aluminum hydroxide, magnesium hydroxide, calcium carbonate, and antimonous oxide.

7. The composite cable according to claim 1, wherein the composite cable is for brake control of a vehicle.

8. The composite cable according to claim 7,
wherein two of the plurality of thick electric wires are used as a pair of power wires that supply power from a control device of an electronic parking brake to an actuator, and
wherein two of the plurality of thin electric wires are used as a pair of signal wires that transmit a signal from an antilock brake system sensor to an antilock brake system control device.

* * * * *